Patented Dec. 15, 1931

1,836,588

UNITED STATES PATENT OFFICE

FRITZ GÜNTHER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

WETTING AND EMULSIFYING PREPARATION

No Drawing. Application filed May 29, 1926, Serial No. 112,696, and in Germany November 19, 1925.

It is known that aqueous solutions of aromatic sulfonic acids, especially naphthalene sulfonic acids, which are substituted by alkyl groups such as propyl, butyl and similar radicals, or of certain other sulfonic acids such for example as dimethyl aniline sulfonic acid, and also of salts of such acids have soap-like properties in that they are capable of easily wetting textile and other fibrous or other materials and of forming solutions or stable emulsions with organic liquids not miscible with water, such as fats, oils, hydrocarbons, higher alcohols, ketones and the like.

I have now found that this soap-like action of sulfonic acids and their salts is considerably increased by water-soluble salts of a light metal (including ammonium salts), which do not give rise to the formation of insoluble compounds with the said sulfonic acids. It is not necessary that the salts of light metals dissolve readily in water, it being sufficient that they are dissolved under the condition prevailing in the employment of the mixture. As examples of suitable salts I mention Glauber's salt, common salt, potassium chlorid, sodium carbonate, sodium bisulfate, calcium sulfate, alpha-naphthalene sulfonic acid sodium salt and the like. The kind of the salt and the quantity best suitable to bring about the desired effect depends on the conditions of each particular case and can easily be ascertained by some tests. Generally the quantity of light metal salt should be more than 5 per cent, by weight, of the sulfonic acid or its salt. In most cases an addition of 10 per cent or more will give the best results.

For example felt is wetted with a solution containing 5 grams of isopropylated naphthalene sulfonic acid sodium and 5 grams of common salt in 1 litre of water much more rapidly than with a solution of 5 grams of the said sulfonic acid salt in 1 litre of water in the absence of light metal salts.

When fats, oils, hydrocarbons and the like are added to an aqueous solution of a sulfonic acid salt of the character described containing a light metal salt, more or less viscous solutions are obtained which, when poured into water, readily mix therewith; in some cases part of the organic compound is thereby separated in the form of a fine stable emulsion. Saturated solutions of hydrocarbons in aqueous solutions of free sulfonic acids of the character described will part with a fraction of the water when light metal salts are added thereto, and are then capable of dissolving further quantities of hydrocarbons.

The light metal salts may be mixed with the sulfonic acids or their salts in a solid state or with solutions of the sulfonic acids, or they may be added or produced when preparing the sulfonic acids or their salts.

The following examples will further illustrate how my invention may be carried out in practice, but the invention is not limited to these examples. The parts are by weight.

Example 1

30 parts of the sodium salt of an alkylated sulfonic acid obtained from beta-naphthalene sulfonic acid and butyl alcohol are dissolved in 140 parts of water and 10 parts of calcined Glauber's salt are added, whereby a mixture is obtained which is capable of dissolving from 20 to 25 parts of tetra-hydro-naphthalene when slightly heating on a water bath.

Example 2

256 parts of naphthalene are converted in the usual manner into beta-naphthalene sulfonic acid by heating with 400 parts of concentrated sulfuric acid to 160° C. The reaction product is allowed to cool to about 90° C., whereupon a mixture prepared at room temperature from 296 parts of ethyl-methyl-carbinol and 400 parts of concentrated sulfuric acid is caused to run in in the course of 2 hours, while vigorously stirring. The reaction is then made complete by maintaining the said temperature for several hours. On stopping the stirrer, the reaction mass separates into two layers, the upper of which contains chiefly the butylated sulfonic acid in conjunction with a certain amount of sulfuric acid. By neutralizing this layer with an alkali and evaporating, a salt of the butylated naphthalene sulfonic acid containing an admixture of alkali metal sulfate is obtained in the solid state.

The sodium salt of butylated naphthalene sulfonic acid thus prepared contains between about 15 and 20 per cent of water-soluble salts, and its aqueous solution is capable of dissolving large quantities of organic liquids not miscible with water, such as hydrocarbons, higher alcohols, ketones and the like.

What I claim is:

1. A composition of matter comprising a homogeneous mixture of an aromatic sulfonic acid containing at least one alkyl group and more than 5 per cent thereof of a light metal salt which itself has no wetting and emulsifying properties, is soluble in water and does not give rise to the formation of insoluble compounds with the sulfonic acid.

2. A composition of matter comprising a homogeneous mixture of a naphthalene sulfonic acid containing at least one alkyl group with more than 2 carbon atoms and more than 5 per cent thereof of a light metal salt which itself has no wetting and emulsifying properties, is soluble in water and does not give rise to the formation of insoluble compounds with the sulfonic acid.

3. A composition of matter comprising a homogeneous mixture of an aromatic sulfonic acid containing at least one alkyl group and at least 10 per cent thereof of a light metal salt which itself has no wetting and emulsifying properties, is soluble in water and does not give rise to the formation of insoluble compounds with the sulfonic acid.

4. A composition of matter comprising a homogeneous mixture of a sulfonic acid of high wetting and emulsifying power, at least 10 per cent thereof of a light metal salt which itself has no wetting and emulsifying properties, is soluble in water and does not give rise to the formation of insoluble compounds with the sulfonic acid, and water and an organic liquid not miscible with water.

5. A composition of matter comprising a homogeneous mixture of an aromatic sulfonic acid containing at least on alkyl group in the form of a water-soluble salt and at least 10 per cent thereof of a light metal salt which itself has no wetting and emulsifying properties, is soluble in water and does not give rise to the formation of insoluble compounds with the sulfonic acid.

6. A composition of matter comprising a homogeneous mixture of an aromatic sulphonic acid containing at least one alkyl group, at least 10 per cent thereof of a light metal salt which itself has no wetting and emulsifying property, is soluble in water and does not give rise to the formation of insoluble compounds with the said sulphonic acid, water and an organic liquid not miscible with water.

7. A composition of matter comprising a homogeneous mixture of an aromatic sulphonic acid containing at least one alkyl group, in the form of a water-soluble salt, at least 10 per cent thereof of a light metal salt which itself has no wetting and emulsifying property, is soluble in water and does not give rise to the formation of insoluble compounds with the said sulphonic salt, water and an organic liquid not miscible with water.

In testimony whereof I have hereunto set my hand.

FRITZ GÜNTHER.